United States Patent [19]

Davey et al.

[11] Patent Number: 5,368,099
[45] Date of Patent: Nov. 29, 1994

[54] INJECTION OF DEXTRINS FOR SUBTERRANEAN MICROBIAL PROCESSES

[75] Inventors: Mary E. Davey, Leucadia; Diane Gevertz, San Diego, both of Calif.; Gary E. Jenneman, Bartlesville, Okla.; Scott T. Kellogg, Moscow, Id.; Willis A. Wood, Poway, Calif.; J. Bennett Clark, Bartlesville, Okla.

[73] Assignee: Phillips Petroleum Company, Bartlesville, Okla.

[21] Appl. No.: 971,489

[22] Filed: Nov. 4, 1992

[51] Int. Cl.$^5$ ............................................. E21B 33/138
[52] U.S. Cl. ....................................... 166/246; 435/281
[58] Field of Search ......................... 166/246; 435/281

[56] References Cited

U.S. PATENT DOCUMENTS

| | | | |
|---|---|---|---|
| 3,032,472 | 5/1962 | Hitzman | 195/3 |
| 4,450,908 | 5/1984 | Hitzman | 166/246 |
| 4,460,043 | 7/1984 | Thompson et al. | 166/246 |
| 4,475,590 | 10/1984 | Brown | 166/246 |
| 4,522,261 | 6/1985 | McInerney et al. | 166/246 |
| 4,534,412 | 8/1985 | Dovan et al. | 166/252 |
| 4,552,217 | 11/1985 | Wu et al. | 166/270 |
| 4,558,739 | 12/1985 | McInerney et al. | 166/146 |
| 4,610,302 | 9/1986 | Clark | 166/246 |
| 4,732,680 | 3/1988 | Weaver et al. | 210/610 |
| 4,800,959 | 1/1989 | Costerton et al. | 166/246 |
| 4,941,533 | 7/1990 | Buller et al. | 166/252 |
| 5,083,611 | 1/1992 | Clark et al. | 166/246 |

OTHER PUBLICATIONS

Voepel, K. C. and Buller, C. S., Formation of an Extracellular Energy Reserve by *Cellulomonas flavigena* Strain KU, Journal of Industrial Microbiology, 5, 131–138 (1990).

GPC Technical Brochure, Maltodextrins and Corn Syrup Solids: Versatility for Pharmaceutical Technology, Grain Processing Corporation, 1600 Oregon St., Muscatine, Iowa 52761.

*Primary Examiner*—William P. Neuder
*Attorney, Agent, or Firm*—Cynthia L. Stokes

[57] ABSTRACT

The use of a dextrin as the carbon source for achieving a complete nutrient medium capable of sustaining microbial activity in subterranean formations is disclosed.

10 Claims, No Drawings

INJECTION OF DEXTRINS FOR SUBTERRANEAN MICROBIAL PROCESSES

This invention relates to the use of dextrins as nutrients in a method for sustaining microbial activity in subterranean formations.

BACKGROUND

In many subterranean microbial processes that are applied in subterranean formations, nutrient selection and injection are controlling factors to successful operations. The microorganisms utilized must be metabolically active to achieve their specific objective.

Numerous microorganisms suitable for achieving various microbial objectives in subterranean formations are known in the art. In order to achieve a specific microbial objective, suitable microorganisms can be selected and injected into the subterranean formation. Oftentimes, however, endogenous microorganisms well suited for achieving a particular microbial objective are already present within the formation.

Recently, a method was disclosed by Clark, et al. U.S. Pat. No. 5,083,611 assigned to Phillips Petroleum Company, which overcame many problems associated with microbial nutrient injection methods then known to the art. This method disclosed the sequential injection into a subterranean formation of sources of individual nutrient components which are deficient in the subterranean formation so that a complete nutrient medium capable of sustaining substantial microbial activity is formed in the formation upon injection of the last nutrient source. Each of the nutrient sources comprised of at least one of the deficient individual nutrient components. Further, each of the nutrient sources, up to and including the next to the last nutrient source injected, is injected in an amount such that at least one individual nutrient component contained therein is retained in the subterranean formation in an amount sufficient for achieving the desired in-situ microbial objective.

The above method prevents the excessive utilization and depletion of nutrient components by microorganisms located in the vicinity of the borehole and also takes advantage of chromatographic retention in order to achieve nutrient media distribution beyond the proximity of the borehole. However, it has been discovered and disclosed by the present application that in order to achieve biomass production (i.e. microbial growth and/or exopolymer production) to plug high permeability zones within subterranean formations, a specific carbon source when used in the above method exhibits greater plugging potential than others presently used. This carbon source is a dextrin used in combination with a phosphorus source, and provides for an unexpected increase in expolymer production resulting in a greater capacity for the desire, plugging. Thus, the specific use of dextrins as the carbon source in the above method, significantly contributes to the art of practicing said method.

It is therefore an object of this invention to provide a carbon source for use in the state-of-the art nutrient injection for subterranean microbial processes which provides for greatly enhanced exopolymer production.

These and other objects of the present invention will becomes apparent upon inspection of the disclosure and the claims herein provided.

SUMMARY OF THE INVENTION

In accordance with the present invention, we have discovered that the production of exopolymer in subterranean formations is significantly increased when a dextrin is injected as the carbon source in subterranean microbial processes.

A process is therefore provided for sustaining microbial activity in subterranean formations which comprises introducing as a microbial nutrient, a dextrin.

DETAILED DESCRIPTION

The dextrin and phosphorus nutrient injection system disclosed herein can generally be used in conjunction with any process wherein microbial activity is induced in a subterranean formation. Examples of such processes include microbial enhanced oil recovery, (MEOR) processes used in oil-bearing subterranean formations and bioremediation processes used in aquifers. Typical microbial enhanced oil recovery processes include those wherein microorganisms are used to alter subterranean formation permeability and those wherein microorganisms are used for in-situ generation of chemicals useful for enhanced oil recovery. Examples of in-situ generated chemicals include water-soluble polymers, surfactants, solvents such as ethanol and acetone, acids, carbon dioxide, etc.

The present inventive nutrient combination of dextrin and phosphorus is particularly well suited for use in conjunction with MEOR processes for improving the volumetric sweep efficiency of subterranean formations. Oil-bearing subterranean formations contain porous rock with heterogenous zones of permeability. Water, used to mobilize oil in a waterflood, preferentially invades the high permeability zones due to its decreased resistance to flow. This causes large reserves of oil contained in the lower permeability regions, to be bypassed. In microbial enhanced oil recovery processes, nutrients are fed to microorganisms located in high permeability formation zones. The nutrients stimulate the microorganisms and cause the microorganisms to generate an increased biomass. This increased biomass results from cell growth and/or the biological production of polymer(s). Once the high permeability formation zones have been plugged, water is diverted to the previously uninvaded low permeability zones and thereby displace oil contained in the low permeability zones.

The microorganisms used in conjunction with the prescott invention are selected for the attainment of a desired microbial objective and then injected into the subterranean formation. Preferably, such microorganisms when used, are injected into the formation prior to nutrient injection. As is known in the art, the particular microorganisms chosen for injection should be tolerant of the conditions, e.g., temperature, pH, salinity etc., existing in the formation. Microorganisms can be injected into subterranean formations using methods which are also well known in the art. The preferred microorganism injection method will depend upon the microorganism(s) chosen, and the specific characteristics of the formation. Oftentimes. endogenous microorganisms capable of achieving a desired microbial objective are already present within the subterranean formation. In order to cause the microorganisms within a subterranean formation, whether endogenous or injected, to produce a desired in-situ result, deficient nutrient components are injected into the formation which facilitates the regulation of where in the formation a complete nutrient package is formed. Deficient nutrient components are those individual nutrient components which are needed by the microorganisms for achievement of a desired microbial objective and which are not already present within the formation in amounts sufficient for achieving the microbial objective. Subterranean formations are typically deficient in phosphorus, nitrogen, or carbon nutrients. Suitable phosphorus sources and nitrogen sources (e.g., ammonium-containing compounds such as ammonium chloride, nitrates such as potassium nitrate, and organic nitrogen sources such as amino acids and peptides), as well as carbon sources (e.g., fats, proteins, simple carbohydrates and complex carbohydrates), and other nutrient sources which are suitable for use in nutrient injection methods are well known in the art. However, selection of a carbon source which is sufficiently deficient in phosphorus and nitrogen and which causes greatly increased in-situ biomass production is extremely beneficial in the practice of the above method. The inventive use of dextrins as the carbon source results in an unexpected increase in microbial activity and therefore in production of biomass.

The term dextrins as used herein means:

A dextrin is a product produced by the dry heating or roasting of unmodified starches or the controlled chemical or enzymatic hydrolysis of wet starch. Examples of suitable dextrins include pyrodextrins, white dextrins, canary dextrins maltodextrins Kodex ® 60 available from A. E. Staley Manufacturing Company and Star-Dri i(SD-1) available from A. E. Staley Manufacturing Company.

The dextrin Star-Dri 1 is classified more specifically as a maltodextrin which is a type of dextrin typically having an average molecular weight between $10^5$ and $10^6$ and a dextrose equivalency of one or less. It is quantitatively hydrolyzed to D-glucose units by the enzyme amyloglucosidase, an enzyme specific for cleaving alpha-1,4 linkages between D-glucose residues. In addition Star-Dri 1 complexes with iodine to form a blue color characteristic of amylose type molecules.

The dextrin Koldex 60 is a pregelatinized, white dextrin that is highly soluble in cold water. It is made by a wet conversion process and has an extremely high level of particle-size uniformity. Koldex 60 typically has an average molecular weight between $10^4$ and $10^5$ and a dextrose equivalency of 1 or less.

When the desired in-situ microbial objective is the saturation of the permeability of an oil-bearing subterranean formation, a preferred dextrin is Star Dri 1, a maltodextrin, having a dextrose equivalent of one or less. When the specific in-situ microbial objective desired is the alteration of the permeability of a subterranean formation, a maltodextrin is the preferred carbon source since the desired plugging increases in direct proportion to growth and exopolymer production promoted by said maltodextrin.

The phosphorus source used in combination with a dextrin carbon source should be in a substantially carbon-nutrient-free solution. This is to avoid achieving a complete nutrient combination and thus microbial activity prior to locating the nutrients in a position in the subterranean formation where microbial activity is most desired. Therefore it is advantageous to first inject a substantially carbon-nutrient-free phosphorus solution which is retained in the subterranean formation and thereafter inject a carbon solution of dextrin. This permits deep penetration of the phosphorus prior to the injection of the carbon source which has less retainability in the subterranean formation. The carbon nutrient solution, being substantially phosphorus free will ultimately catch up to the previously injected phosphorus solution and form a complete nutrient combination deep within the subterranean formation. Microbial activity will thus occur where complete nutrient combination exists and thus where such activity is most desired.

The following examples have been provided merely to illustrate the practice of the invention and should not be read as to limit the scope of the invention or the appended claims in any way.

EXAMPLES

To obtain the results of Examples I and II, the following procedure was performed.

Two 2.54 cm diameter core plugs were drilled from a 4-inch diameter core obtained from the North Burbank Field, Osage County, Okla. Core plugs were drilled with a hollow core bit along the bedding plane. Cores were cleaned in a Soxhlet extractor using alternating toluene and methanol watches until all oil was removed. End-plates, made from a resin material, were tapped and epoxied to the ends of the core after they had been squared off with a diamond blade saw. A small space the thickness of notebook paper was left between the core and the end-plates to allow radial flow across the face of the core. Cores were then epoxied along the sides and allowed to dry. Once dry, the sides of the cores were tapped and fitted with either 1/16 inch or ⅛ inch stainless steel tubing. Taps were placed halfway between the ends of the core and one inch either side of this center point. Tubing was also attached to both ends (i.e. inlet and outlet) of the cores via stainless steel connectors. Cores were mounted vertically (i.e. outlet end up) inside a stainless steel accumulator filled with distilled water. Inlet and outlet lines, as well as, pressure tap and flow lines exited the accumulator via a pass-through fitting attached to one end of the accumulator.

Cores were then vacuum saturated with filtered brine collected from the bottom of a skimmer tank (Tract 5 Tank Battery) upstream of the injection manifold located at the North Burbank Unit, Osage County, Shidler, Okla. This brine was collected in bottles pro-incubated in an anaerobic give box to remove traces of oxygen and transported back to the lab the same day. The approximate composition of the brine is listed in Table 2. The brine was filtered via a 0.22 micron cellulose acetate membrane filter into a sterile container housed inside a Coy anaerobic hood, (Coy Laboratory Products, Inc.). Cores were then injected with clean Burbank crude oil. Oil was cleaned by filtration and centrifugation. Crude oil was injected until reaching irreducible water saturation. Then filtered brine was injected at a velocity of 21 ft/d until no more residual oil was displaced.

The accumulator containing the core was wrapped in a heating mantle and brought up to a temperature of approximately 45° C. Then the annulus of the accumulator was raised to 1000 psig with a hydraulic hand pump. Pressure was generated inside the core by pumping filtered brine through the core with a displacement pump and then through a backpressure regulator set at 500 psig. The injection pumps forced oxygen-free water against one side of a piston contained within a liquid filled accumulator; thereby, forcing brine contained on the opposite side of the piston through the inlet end of the core. Differential pressure taps located at the inlet and outlet end, as well as, along the length of the core were attached to Validyne pressure transducers via ⅛ inch nylon tubing filled with gauge oil. Signals from the pressure transducers were passed through a DM-200 signal conditioner and then through an A/D board and logged via a computer data acquisition program as units of pressure. Pressure was converted to resistance factors by the formula $RF=P/Po$, where P is the test pressure recorded during the experiment and Po is the initial pressure recorded before injection of nutrients. Resistance factors are a measure of the relative increase in pressure or reduction in permeability and are therefore an indicator of plugging. The abbreviations RF1, RF2, RF3 and RF4 refer to resistance factors measured over the first, second, third and fourth segments of the core, respectively. Distances of the first, second, third and fourth segments of the cores from the inlet end are approximately 0.5, 1.5, 2.5, and 3.0 inches, respectively. In order to demonstrate in-depth permeability reduction it is desirable to show significant permeability reductions ($RF=10$ or greater) in the second and third segments of the core (i.e. RF2 or RF3). Increases in RF1 are indicative of face plugging and not in-depth plugging.

TABLE 1

| Core | Length | Permeability mD | Porosity % | Pore vol. cc | N.B. # |
|---|---|---|---|---|---|
| A | 7.72 | 442 | 25 | 7.72 | 34709-50 |
| B | 7.44 | 396 | 26 | 9.85 | 34352-96 |

TABLE 2

| Chemical Analysis of Tract 5 Brine | |
|---|---|
| COMPONENT | T-5 BRINE (mg/l) |
| ammoninum | 33 |
| chloride | 66000 |
| sulfate | 20 |
| TOC[1] | 25 |
| calcium | 6290 |
| barium | 755 |
| magnesium | 1250 |
| sodium | 31000 |
| iron | 16.8 |
| TDS[2] | 127300 |

[1]total organic carbon
[2]total dissolved solids

EXAMPLE I

After flooding core A to residual oil saturation and connecting pressure monitoring equipment as described above, core A was injected with 1270 cc of unfiltered Tract 5 brine at a velocity of approximately 21 ft/d. This served as the microbial inoculum to support growth and polymer production in the core. Next, approximately 120 cc of filtered Tract 5 brine was injected followed by 1.3 pore volumes of a 1.56 mM solution of sodium trimetaphosphate dissolved in filtered Tract 5 brine. All chemical solutions injected into the core with the exception of the unfiltered brine inoculum were first filtered through a 0.22 um filter. The phosphate slug was followed by approximately 13.7 cc of filtered Tract 5 brine. Then a solution of 0.4 percent glucose (Commercial grade, 99 percent) dissolved in Tract 5 brine was injected at velocity of approximately 7.5 ft/d for 17.2 days. During this period of time approximately 396 cc of the glucose solution was injected into Core A. A large reduction in permeability was observed at the front of the core as indicated by a RF1 of 100. This relates to a 99 percent decrease in the original permeability; however, no significant plugging (i.e. $RF<5$) was observed in the distal segments of the core (i.e. RF2, RF3, or RF4). This suggests that glucose supported growth and plugging only at the front face of the core (i.e. no in-depth plugging).

In order to determine if SD-1 could enhance the in-depth plugging of this core, a solution containing a mixture of 0.2 percent SD-1 and 0.2 percent glucose was injected into core A. Previous to this injection, the core had been injected with approximately 1100 cc of filtered Tract 5 brine to increase the effluent pH from 4.4 to 6.1 so that the pH was close to that prior to glucose injection. During approximately two days of injection, no increase in resistance factors was noticed along the entire length of the core indicative of no further increase in plugging. During this time the effluent pH dropped from 6.1 to 4.4 indicating that the carbohydrate mixture was being fermented. Therefore a 50:50 mixture of glucose and SD-1 was not adequate to promote in-depth plugging.

The core was then switched over to injection with 0.4 percent SD-1 without any glucose and without any prior pH adjustment. Within one day of injection RF1 began to increase reaching a maximum value of 130 after 3 days indicative of a further increase in face plugging. Within one and one-half days of SD-1 injection pressure began to increase significantly at RF2, and by the fifth day, pressure at RF2 had increased to as high as 55. This relates to a reduction in the original permeability of approximately 98 percent. Furthermore, this type of plugging at RF2 indicates an in-depth permeability reduction not attained with the previous treatments.

EXAMPLE II

Core B was treated in a similar fashion to core A except that the core was inoculated with only 492 cc of unfiltered Tract 5 brine. This was followed by the injection of approximately 3 PV of filtered Tract 5 brine which was followed by 50PV of a 1.56 mM solution of sodium trimetaphosphate dissolved in filtered Tract 5 brine. After the phosphate slug, an additional 2 PV of filtered brine was injected immediately followed by injection of a 0.2 percent solution of SD-1 dissolved in Tract 5 brine. The SD-1 slug was injected at a velocity of approximately 1.6ft/d for the next 23 days. During this time pressure was observed to increase along the entire length of the core; however, large pressure fluctuations made it impossible to determine accurate resistance factors. Therefore, by approximately the 16th day of SD-1 injection a backpressure regulator was added to the effluent end of the core and the pressure set at 500 psig (as described above). This had the effect of increasing the injection pressure to 500 psig. The increase in injection pressure stabilized the pressure readings allowing an accurate measurement of RF to be made along the core.

The reason for this stabilizing effect on pressure is due to the effect of increased pressure on gas solubility. During fermentation of the SD-1 the bacteria produce gases which form a free gas phase within the core. This free gas phase has the effect of reducing the permeability to brine and is mobile and subject to compression and decompression. This has the effect of creating fluctuating pressures along the core. The increased injection pressure compressed the gas and stabilized the pressure readings.

The RF values observed along the length of this core after the 23rd day of SD-1 injection were: RF1=125; RF2=30; RF3=20 and RF4=11. These results are indicative of significant in-depth permeability reductions. Furthermore, they demonstrate that these in-depth reductions can be achieved while practicing nutrient injection using SD-1 in a core not previously treated with glucose.

Examples III–V follow the procedure infra.

The following tests were conducted using brine obtained from the Tract 5 Tank Battery of the Burbank field, Osage County, Okla. The samples were collected as described previously and shipped overnight to a laboratory and immediately placed in a Coy anaerobic chamber to ensure anoxic samples. All nutrient chemicals used in these tests were reagent grade. In the following tests, the culture bottles were prepared by the enrichment procedure described below with the specified variations in each test, i.e., different batch of brine for each test, different types of carbohrydrate, and different types of phosphorus sources.

ENRICHMENT PROCEDURE

Serum bottles, 120 cc (Wheaton, cat. no. 223747) containing 0.1 gram of carbohydrate are placed in a Coy anaerobic chamber for at least twelve hours to ensure anoxic enrichment bottles. One hundred milliliters of unfiltered anaerobic brine is added to the bottles in the chamber along with phosphorus to a final concentration of one hundred micromolar. The bottles are then sealed with butyl rubber stoppers (Bellco, cat. no. 2048-11800), removed from the anaerobic chamber, and crimped with aluminum seals (Wheaton, cat. no. 224193). The enrichments are then mixed by shaking to thoroughly dissolve the carbohydrate. These enrichment bottles are then incubated at forty-five degrees Celsius (reservoir temperature) for at least ten days or until macroscopic turbidity, indicative of bacterial growth, is readily observed in the supernatant. The bottles must remain stationary the entire time of incubation.

PROTOCOL FOR SCREENING "POLYMER" FORMATION

"POLYMER" DETERMINATION

This material, prior to swirling, was cohesive and dispersed at the bottom of the bottles.

Procedure:

The serum bottles were held by the neck between the thumb and forefinger and gently swirled in a unidirectional motion.

Scoring System:

++Bottle: As the bottle was swirled, the centrifugal force caused the viscous film on the bottom of the bottle to detach from the glass. The mucilaginous mass floated up from the bottom of the bottle and remained coalesced. Copious amounts of material were readily observed, and the mass maintained its integrity.

+Bottle: As the bottle was swirled, the centrifugal force caused the viscous film on the bottom of the bottle to detach from the glass. Mucilaginous strands of material floated up from the bottom of the bottle and were discernible within the enrichment liquid. As with ++ bottles, these strands of material were discernible in the enrichment liquid.

−Bottle: As the bottle was swirled and observed, mucilaginous material was not discernible in the enrichment liquid.

EXAMPLE III

The enrichments were performed with T5 brine. Six preparations were made; two contained 0.2 percent Star Dri 1, two contained 0.2 percent Kodex 60, and two contained 0.2 percent Stadex 94, and each of the six contained 100 micromolar phosphorus. The six bottles, containing 0.2 grams of carbohydrate, were placed in the Coy anaerobic chamber and allowed to reduce overnight. On the following day 100 mls of brine and 100 microliters of an anaerobic 100 mM phosphorus solution concentrate were added to the bottles in the chamber. The bottles were then stoppered, sealed, and incubated as described in the enrichment procedure.

After two weeks incubation turbidity was apparent, therefore the bottles were removed from the incubator and swirled to determine if there was polymer present. The two bottles containing Star Dri 1 and the two bottles containing Koldex 60 were found to have copious amounts of mucilaginous material, therefore these bottles were given a "++" score. The two bottles containing Stadex 94 had strands of mucilaginous material, therefore these bottles were given a "+" score.

EXAMPLE IV

These enrichments were performed with T5 brine in triplicate and contained one of the following carbohydrates: sucrose (0.2 percent), glucose (0.2 percent), molasses (0.4 percent), or Star Dri (0.2%) and 100 micromolar phosphorus. The bottles, containing 0.2 grams of carbohydrate, were placed in the Coy anaerobic chamber and allowed to reduce overnight. On the following day the brine was received and 100 mls of brine and 100 micromolar of the phosphorus solution concentrate were added to the bottles in the chamber. The bottles were then stoppered, sealed, and incubated as described in the enrichment procedure.

After two weeks incubation, the bottles were removed from the incubator and swirled to determine if there was polymer present. There was no discernible mucilaginous material in any of the bottles, containing sucrose, glucose, or molasses, therefore they were given a "−" score. However, two of the three bottles containing Star Dri 1 contained mucilaginous material, therefore these two cultures were given "++" score. The other Star Dri 1 enrichment was given a "−" score.

EXAMPLE V

These enrichments were performed with T5 brine in duplicate and contained 0.2 percent Clearsweet 95 or glucose and 100 micromolar sodium trimetaphosphate. The bottles, containing 0.2 grams of carbohydrate, were placed in the Coy anaerobic chamber and allowed to reduce overnight. On the following day the brine was received and 100 mls of brine and 100 microliters of a 100 mM sodium trimetaphosphate concentrate were added in the chamber to the bottles. The bottles were then stoppered, sealed, and incubated as described in the enrichment procedure.

After two weeks incubation, the bottles were removed from the incubator and were all found to give comparable growth. The bottles were swirled to determine if there was polymer present. There was no discernible mucilaginous material in the three bottles containing Clearsweet 95 or the three bottles containing glucose, therefore they were all given a "—" score.

A summary of the results from these Examples (III-V) is given in Table 3.

A variety of carbohydrates have been tested in T5 brine enrichments in order to examine their ability to stimulate the formation of "polymer" by the bacterial consortia. The following conclusions have been made:

1. Low molecular weight sugars (i.e. dextrose equivalency>20), either alone or in combination with a dextrin (i.e. Star-Dri 1) and a suitable phosphorus source, did not produce sufficient in-depth plugging in rock cores.
2. Star-Dri 1 alone (dextrose equivalency<1) amended with a suitable phosphorus source does produce sufficient in-depth plugging in rock cores.
3. Dextrins such as Koldex 60 and Star-Dri 1 stimulate production of biopolymer; whereas, low molecular weight sugars and dextrins with a dextrose equivalency of greater than 20 do not.

TABLE 3

| CARBOHYDRATE | TYPE | SOURCE | POLYMER |
| --- | --- | --- | --- |
| Star Dri 1 | Dextrin | A.E. Staley Manufacturing Co. Decatur, Illinois | ++ |
| glucose | simple sugar | J.T. Baker Chemical Co. Phillipsburg, N.J. | — |
| Koldex 60 | Dextrin | A.E. Staley Manufacturing Co. Decatur, Illinois | ++ |
| Stadex 94 | Dextrin | A.E. Staley Manufacturing Co. Decatur, Illinois | + |
| Maltrin M440 | Dextrin | Grain Processing Corporation Muscatine, Iowa | + |
| Lo Dex 5 | Dextrin | American Maize - Products Co. Hammond, Indiana | + |
| Clearsweet 95 | corn syrup | Cargill Milling Division Memphis, Tennessee | — |
| Clearsweet 99 | corn syrup | Cargill Milling Division Memphis, Tennessee | — |
| Star Dri 24R | corn syrup | A.E. Staley Manufacturing Co. Decatur, Illinois | — |
| Star Dri 35R | corn syrup | A.E. Staley Manufacturing Co. Decatur, Illinois | — |
| Maltrin M365 | corn syrup | Grain Processing Corporation Muscatine, Iowa | — |
| molasses | simple sugar | Grandma's Molasses "unsulphured" | — |
| sucrose | simple sugar | Sigma Chemical Co. St. Louis, Missouri | — |

That which is claimed is:

1. A process for sustaining microbial activity in subterranean formations which comprises introducing as a microbial nutrient a dextrin.

2. It a process of injecting microbial nutrients into a subterranean formation comprising the step of sequentially injecting sources of individual nutrient components based on their quantitative formation retainability; which are deficient in said subterranean formation, the improvement which comprises using as a carbon source, a dextrin.

3. In a process for sustaining microbial activity in subterranean formations comprising the steps of injecting a substantially carbon nutrient-free first nutrient solution comprising a phosphorus nutrient source into said subterranean formation; and thereafter, injecting a substantially phosphorus-nutrient-free second nutrient solution comprising a carbon nutrient source into said subterranean formation, the improvement which comprises using as said carbon nutrient source a dextrin.

4. The method of claim 3 wherein said dextrin is a (maltodextrin).

5. The method of claim 4 wherein said maltodextrin has a dextrose equivalency of less than or equal to 20.

6. The method of claim 4 wherein said maltodextrin has a dextrose equivalency of about 1 or less.

7. The method of claim 6 wherein said maltodextrin has an average molecular weight between $10^5$ and $10^6$.

8. The method of claim 3 wherein said dextrin has a dextrose equivalency of about 1 or less and an average molecular weight between $10^4$ and $10^5$.

9. The method of claim 1 wherein said subterranean formation is an oil-bearing subterranean formation and said process is used to enhrance oil recovery.

10. The method of claim 1 wherein said desired in-situ microbial. objective is the alteration of the permeability of said subterranean formation.

* * * * *